United States Patent
Novicov

(10) Patent No.: US 10,334,650 B2
(45) Date of Patent: Jun. 25, 2019

(54) AUTOMATIC PEER SELECTION IN A FIELD OF COMMON PEERS

(71) Applicant: Yodel Code LLC, Palo Alto, CA (US)

(72) Inventor: Aleksey Novicov, Palo Alto, CA (US)

(73) Assignee: Yodel Code LLC, Palo Alto, CA (US)

(*) Notice: Subject to any disclaimer, the term of this patent is extended or adjusted under 35 U.S.C. 154(b) by 481 days.

(21) Appl. No.: 14/608,721

(22) Filed: Jan. 29, 2015

(65) Prior Publication Data

US 2015/0215292 A1 Jul. 30, 2015

Related U.S. Application Data

(60) Provisional application No. 61/933,269, filed on Jan. 29, 2014.

(51) Int. Cl.
| | |
|---|---|
| *H04L 9/32* | (2006.01) |
| *H04W 76/15* | (2018.01) |
| *H04W 12/02* | (2009.01) |
| *H04W 4/80* | (2018.01) |
| *H04W 12/04* | (2009.01) |

(52) U.S. Cl.
CPC ............ *H04W 76/15* (2018.02); *H04W 4/80* (2018.02); *H04W 12/02* (2013.01); *H04W 12/04* (2013.01)

(58) Field of Classification Search
CPC ... H04W 4/008; H04W 76/025; H04W 76/02; H04W 76/10; H04W 76/15; H04W 4/80; H04W 12/02; H04W 12/04; H04L 9/32; H04L 9/3273; G06F 21/30; G06F 21/31; G06F 21/36; G06F 21/44; G06F 21/445
See application file for complete search history.

(56) References Cited

U.S. PATENT DOCUMENTS

| | | | |
|---|---|---|---|
| 4,757,333 A | 7/1988 | Baker et al. | |
| 6,195,667 B1 | 2/2001 | Duga et al. | |
| 6,275,934 B1 | 8/2001 | Novicov et al. | |
| 6,331,865 B1 | 12/2001 | Sachs et al. | |
| 6,363,418 B1 | 3/2002 | Conboy et al. | |
| 8,577,292 B2 | 11/2013 | Huibers | |
| 2002/0174145 A1 | 11/2002 | Duga et al. | |
| 2008/0307514 A1* | 12/2008 | Kusakari | G06F 21/31 726/7 |
| 2011/0053558 A1* | 3/2011 | Teague | H04L 9/3273 455/411 |
| 2013/0157573 A1* | 6/2013 | Aldaz | H04W 4/008 455/41.2 |
| 2013/0225078 A1* | 8/2013 | Johansson | H04W 76/10 455/41.2 |

(Continued)

FOREIGN PATENT DOCUMENTS

| | | |
|---|---|---|
| EP | 0219264 A1 | 4/1987 |
| WO | 00/23926 A1 | 4/2000 |
| WO | 0023914 A1 | 4/2000 |

*Primary Examiner* — Shewaye Gelagay
*Assistant Examiner* — Amie C. Lin
(74) *Attorney, Agent, or Firm* — Haynes Beffel & Wolfeld LLP; Ernest J. Beffel, Jr.

(57) ABSTRACT

The technology disclosed relates to secure exchange of private data between mobile devices. Pairwise cryptographic connections are automatically established between a first and other mobile devices. Independently generated distinctive visual traits are generated that allow a user to verify which two devices will exchange information, upon acceptance of a match between respective visual traits.

21 Claims, 11 Drawing Sheets

System Block Diagram

(56) References Cited

U.S. PATENT DOCUMENTS

| | | | |
|---|---|---|---|
| 2013/0260690 A1* | 10/2013 | Cha | H04B 7/26 455/41.2 |
| 2014/0280983 A1* | 9/2014 | Paluch | H04L 67/14 709/227 |
| 2014/0370807 A1* | 12/2014 | Lei | G06K 9/00496 455/41.2 |
| 2015/0058942 A1* | 2/2015 | Dermu | G06F 21/445 726/6 |
| 2015/0161477 A1* | 6/2015 | Kashyap | H04N 21/41407 382/181 |
| 2016/0338117 A1* | 11/2016 | Pandit | H04L 67/1095 |

* cited by examiner

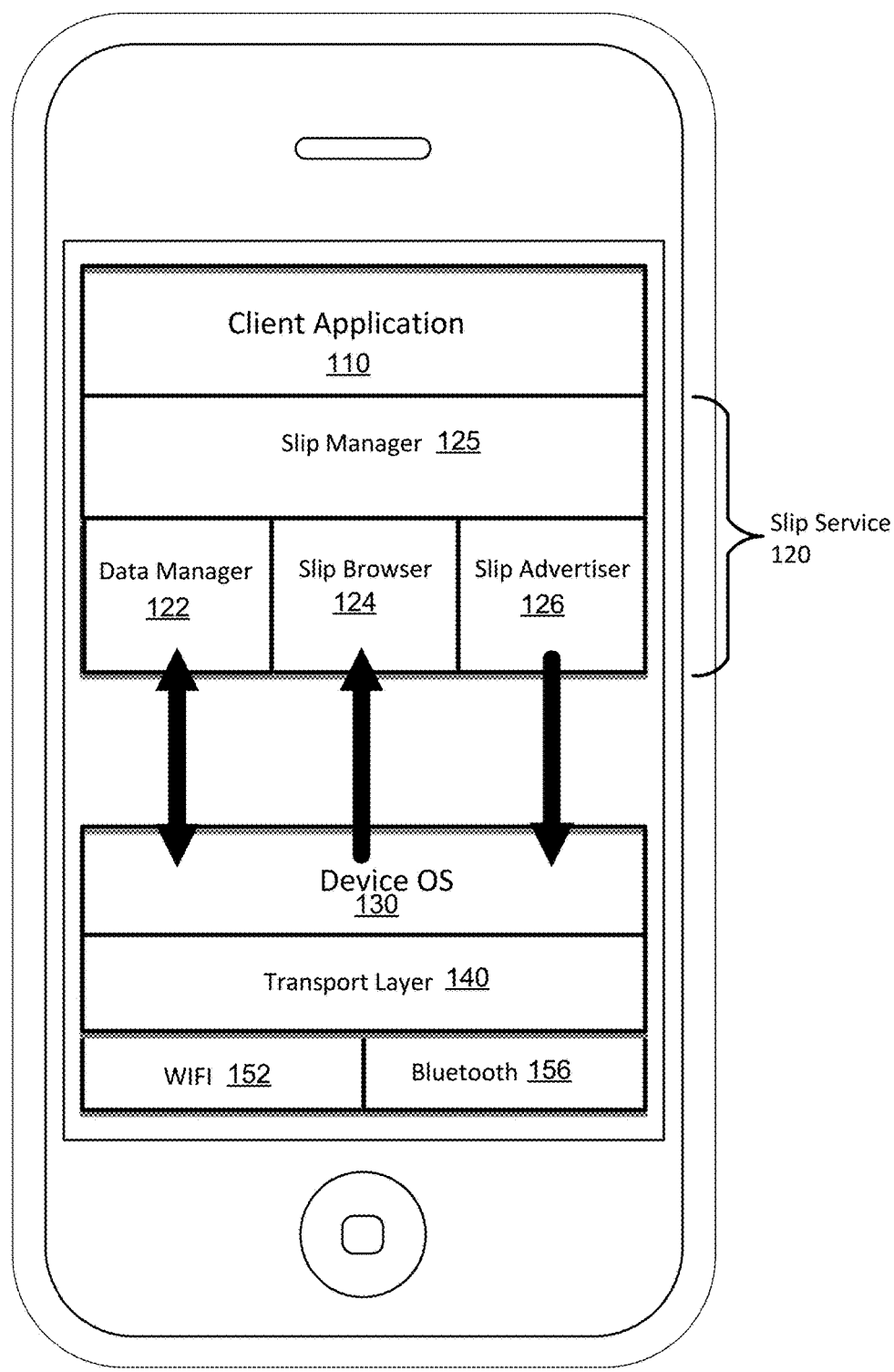
Figure 1 - System Block Diagram

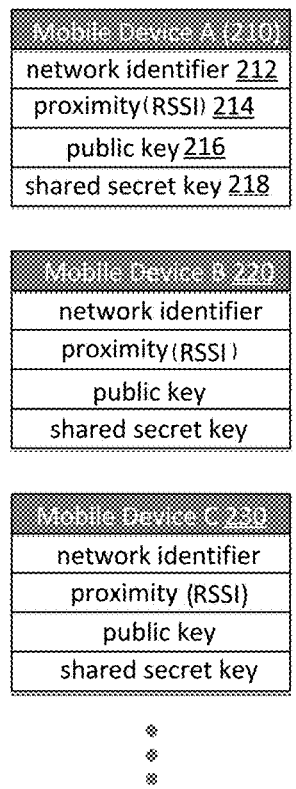
Figure 2- Array of Data Structures Representing Mobile Devices in a Single Device
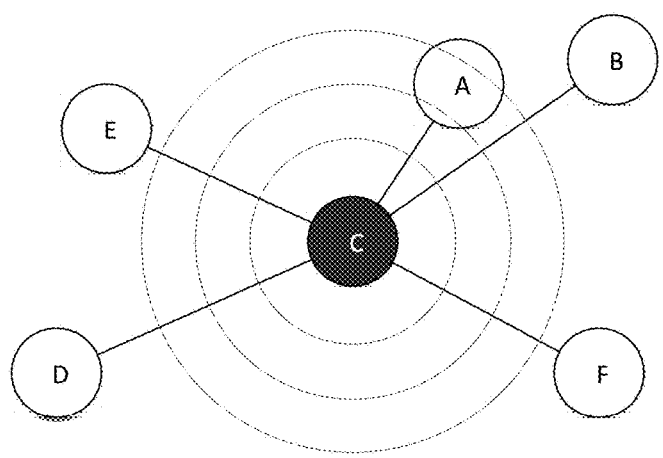
Figure 3- Mobile Device Discovery

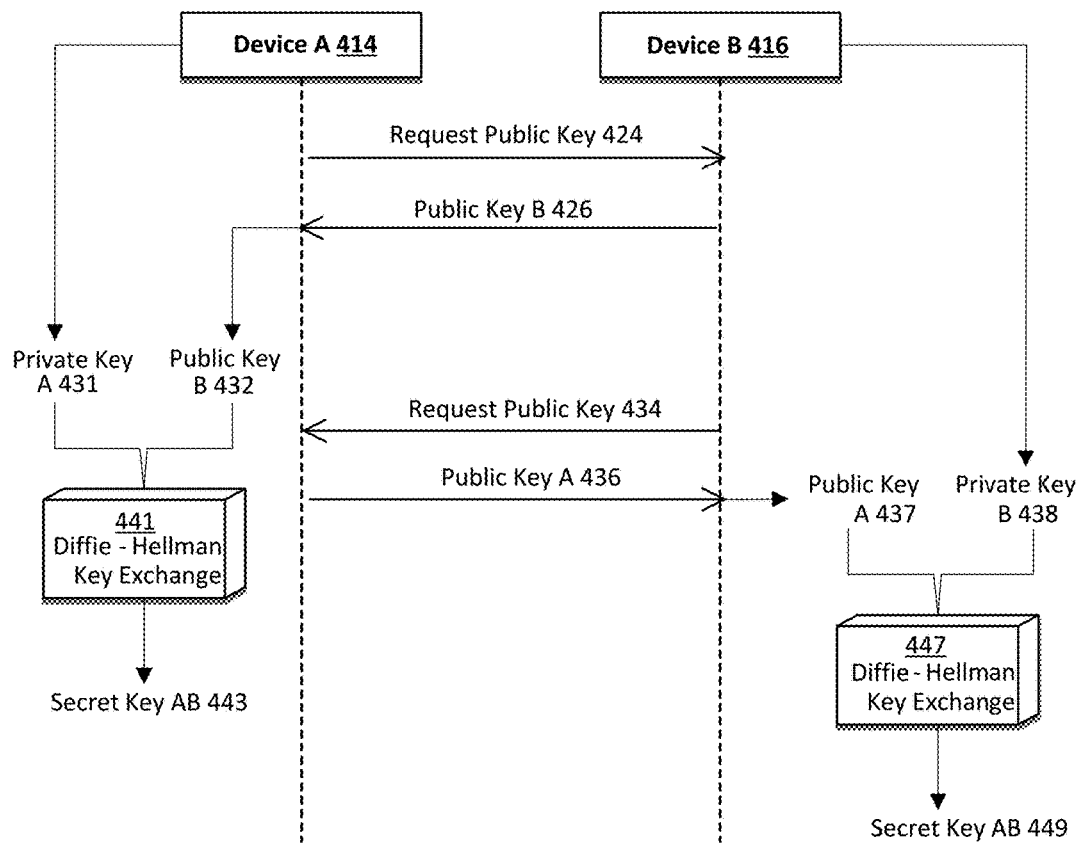
Figure 4- Secret Key Generation

DEVICES' Secret Keys

| A | B | C | D | E | F |
|---|---|---|---|---|---|
|  | $S_{AB}$ | $S_{AC}$ | $S_{AD}$ | $S_{AE}$ | $S_{AF}$ |
| $S_{AB}$ |  | $S_{BC}$ | $S_{BD}$ | $S_{BE}$ | $S_{BF}$ |
| $S_{AC}$ | $S_{BC}$ |  | $S_{CD}$ | $S_{CE}$ | $S_{CF}$ |
| $S_{AD}$ | $S_{BD}$ | $S_{CD}$ |  | $S_{DE}$ | $S_{DF}$ |
| $S_{AE}$ | $S_{BE}$ | $S_{CE}$ | $S_{DE}$ |  | $S_{EF}$ |
| $S_{AF}$ | $S_{BF}$ | $S_{CF}$ | $S_{DF}$ | $S_{EF}$ |  |

$S_{XY}$ signifies a (symmetric) secret key shared between Device X and Device Y Figure 5- Shared Secret Keys Within Each Device Device C Focused On
Device A Device A Focused On
Device B Device B Focused On
Device A Figures 6 - Automatic Peer Selection

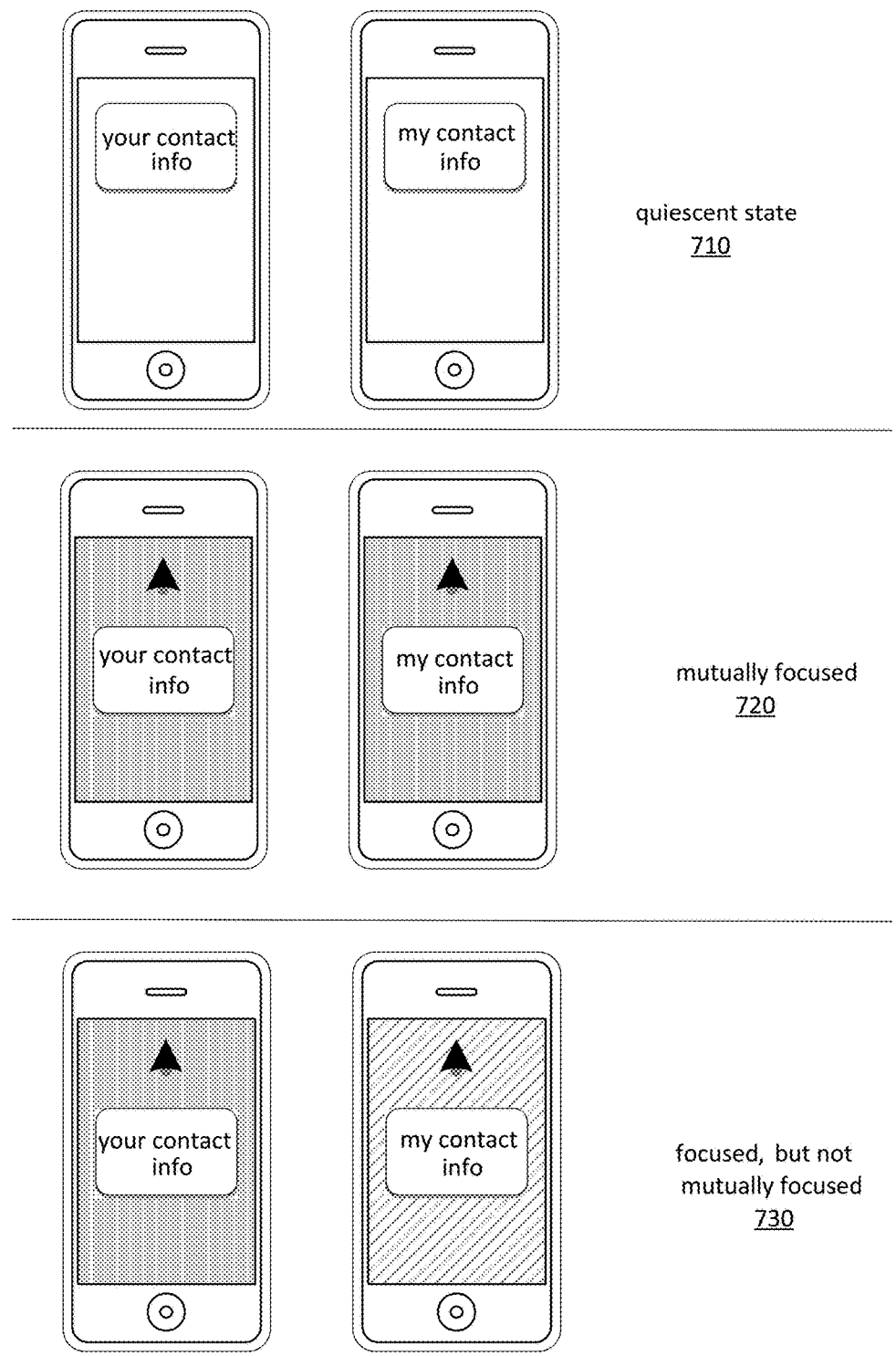
Figure 7- Bilateral Visual Confirmation

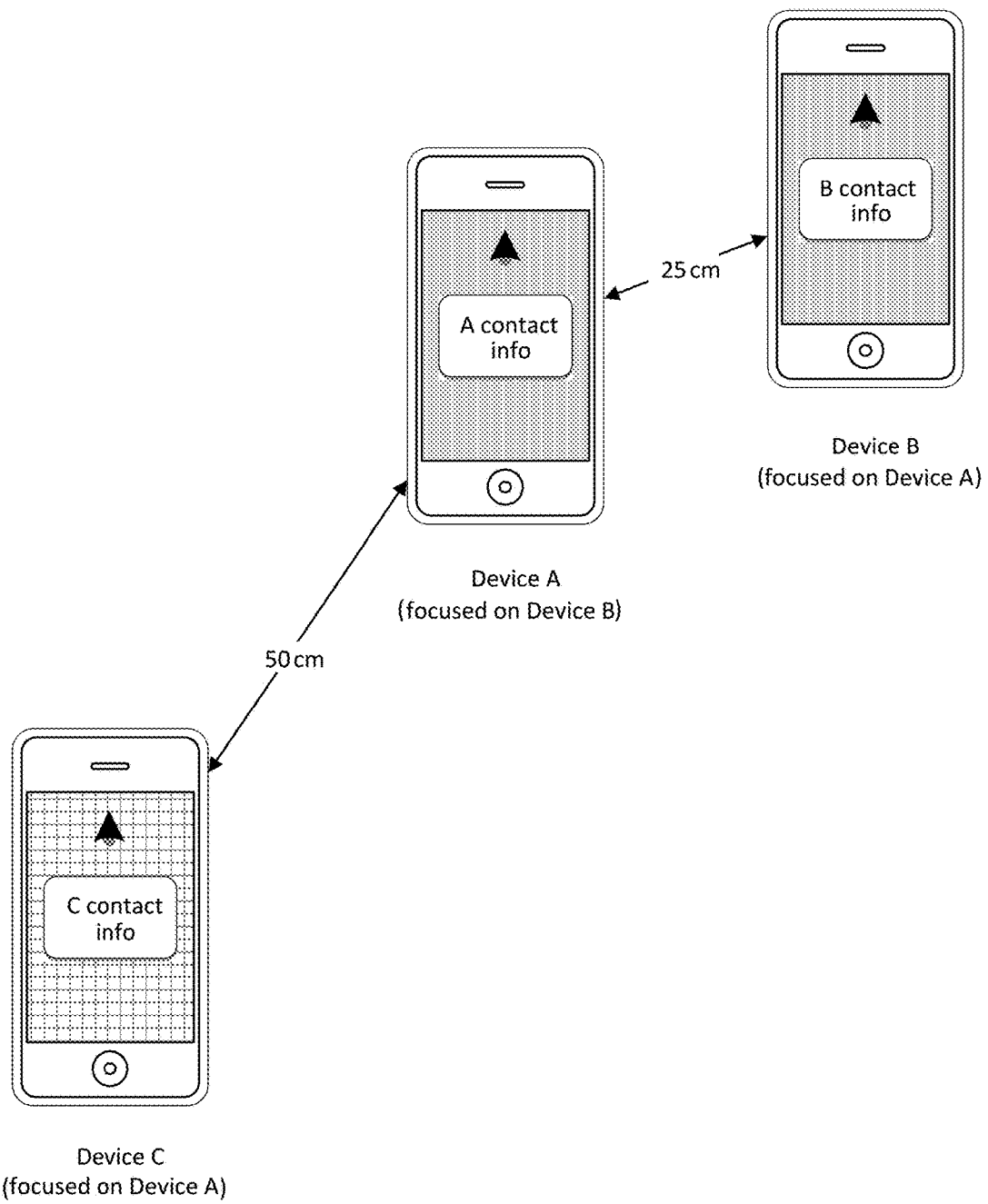
Figure 8 - Device A and Device C Not Mutually Focused

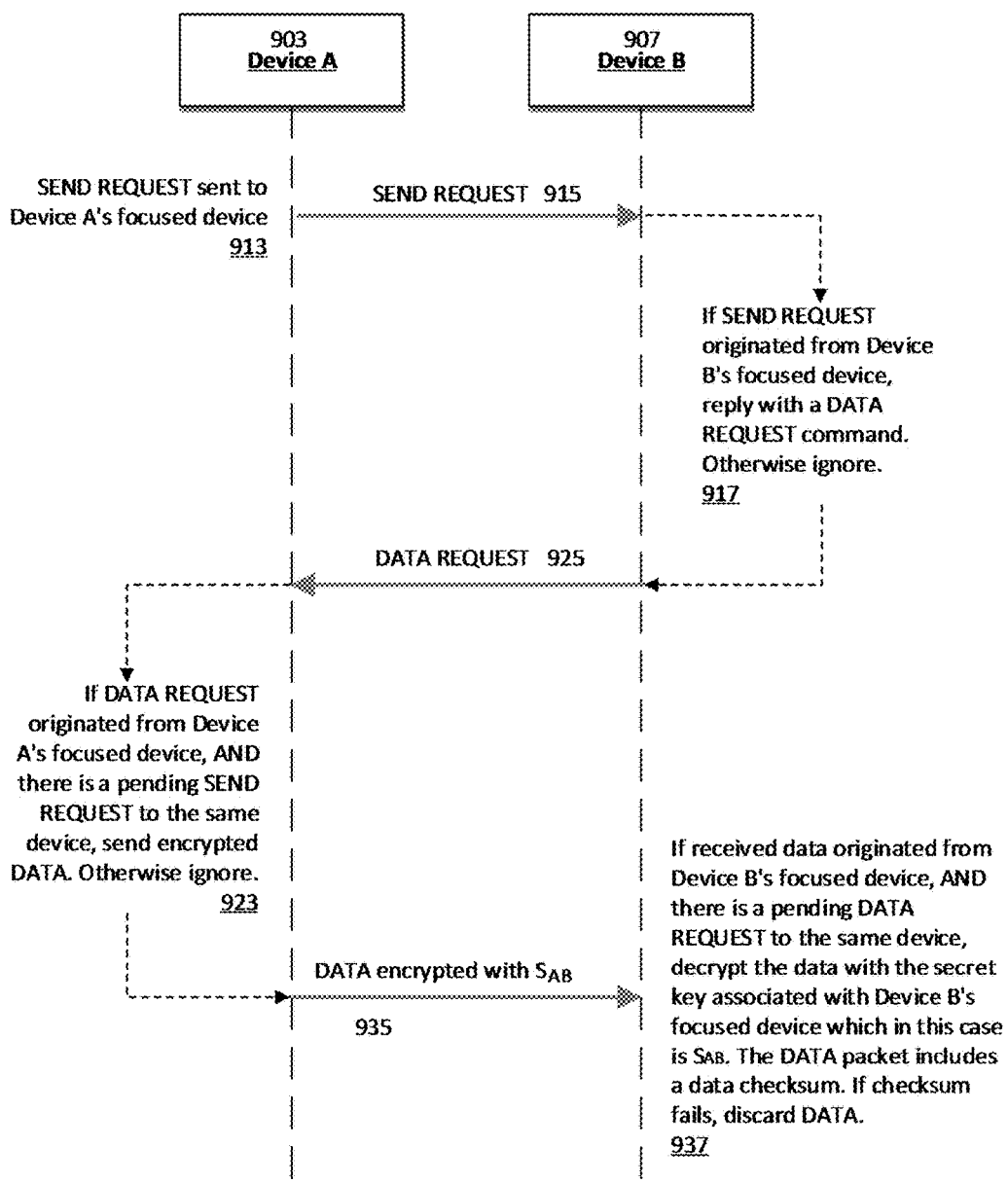
Figure 9 - Data Exchange

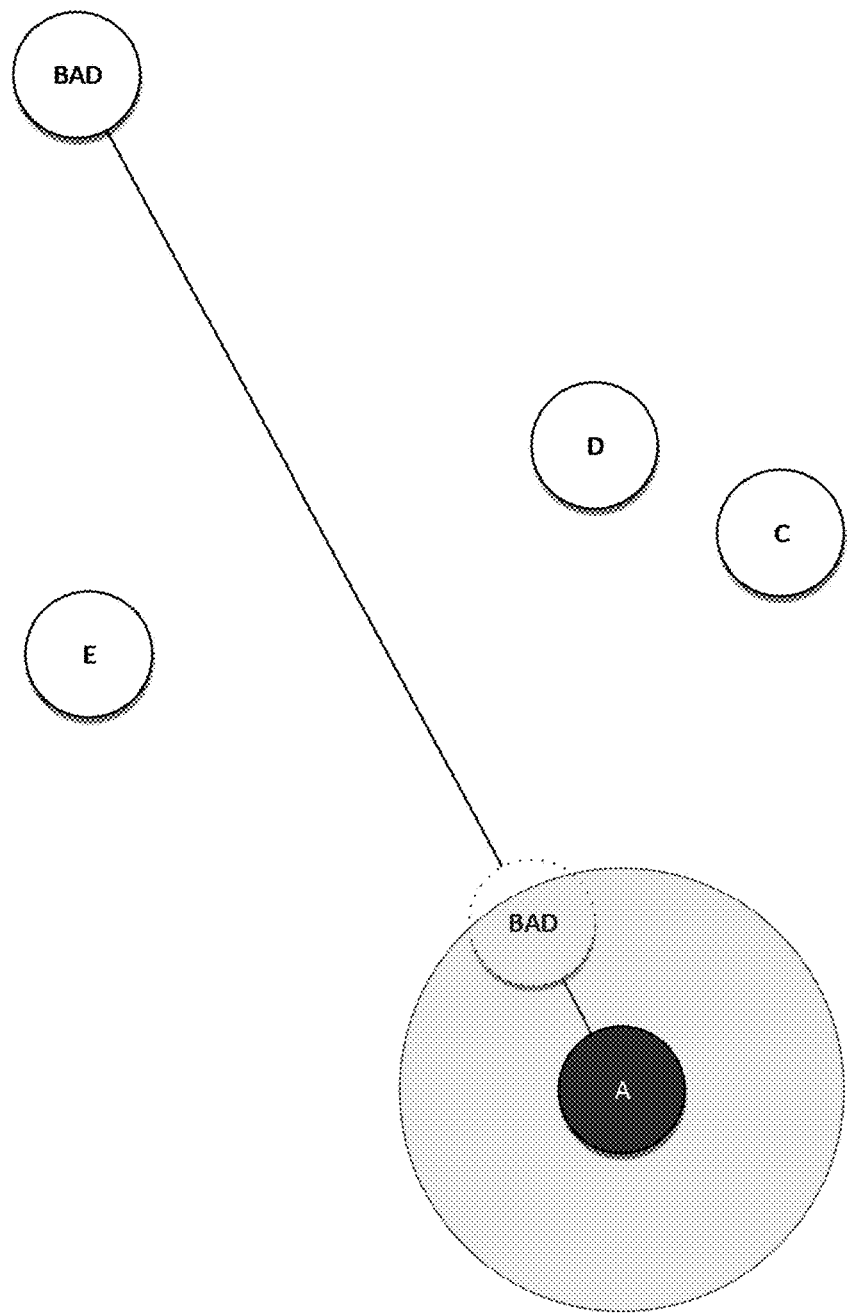
Figure 10 - Bad Actor Faking Proximity

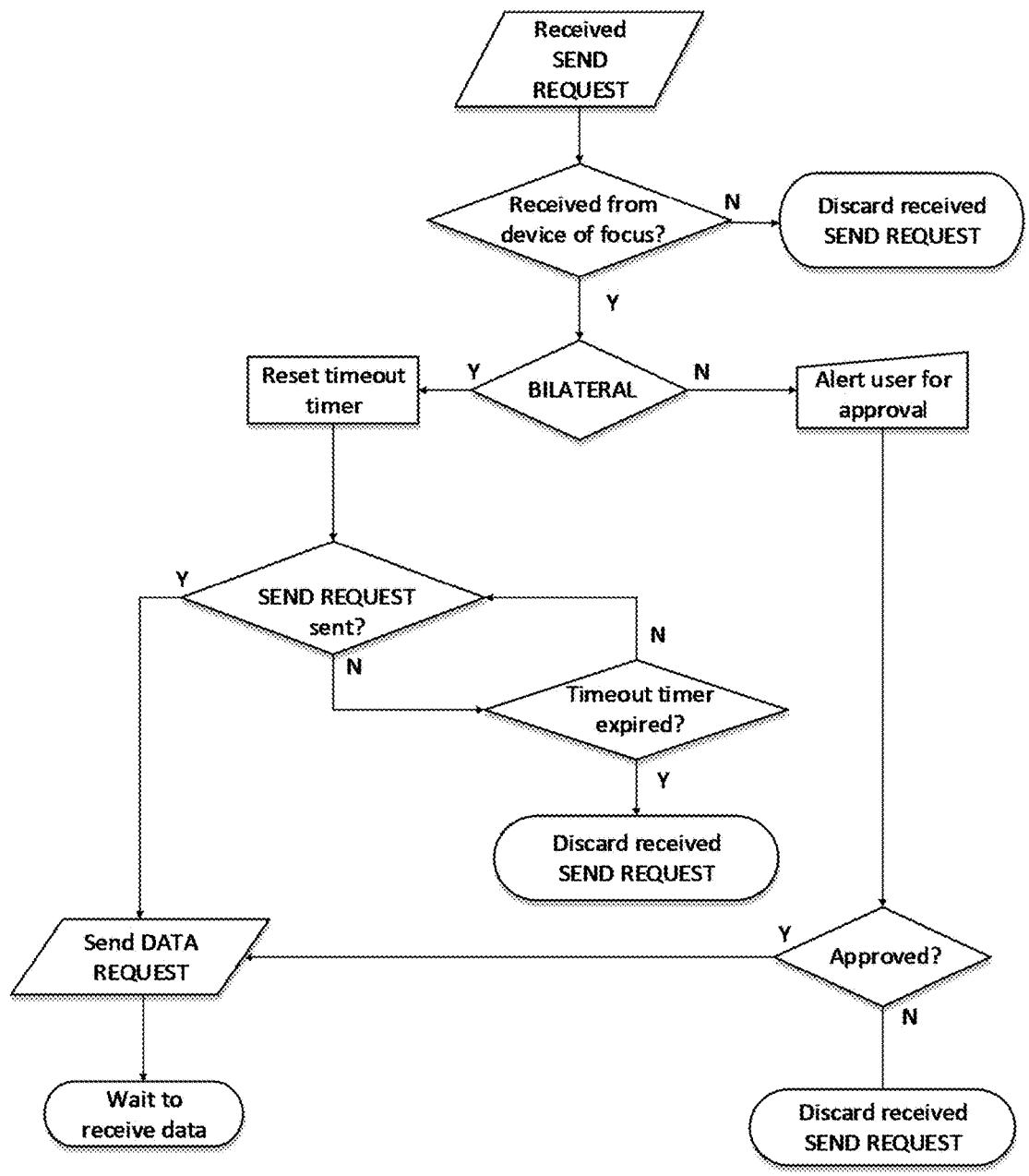
Figure 11 - Bilateral Data Exchange - Receiving SEND REQUEST

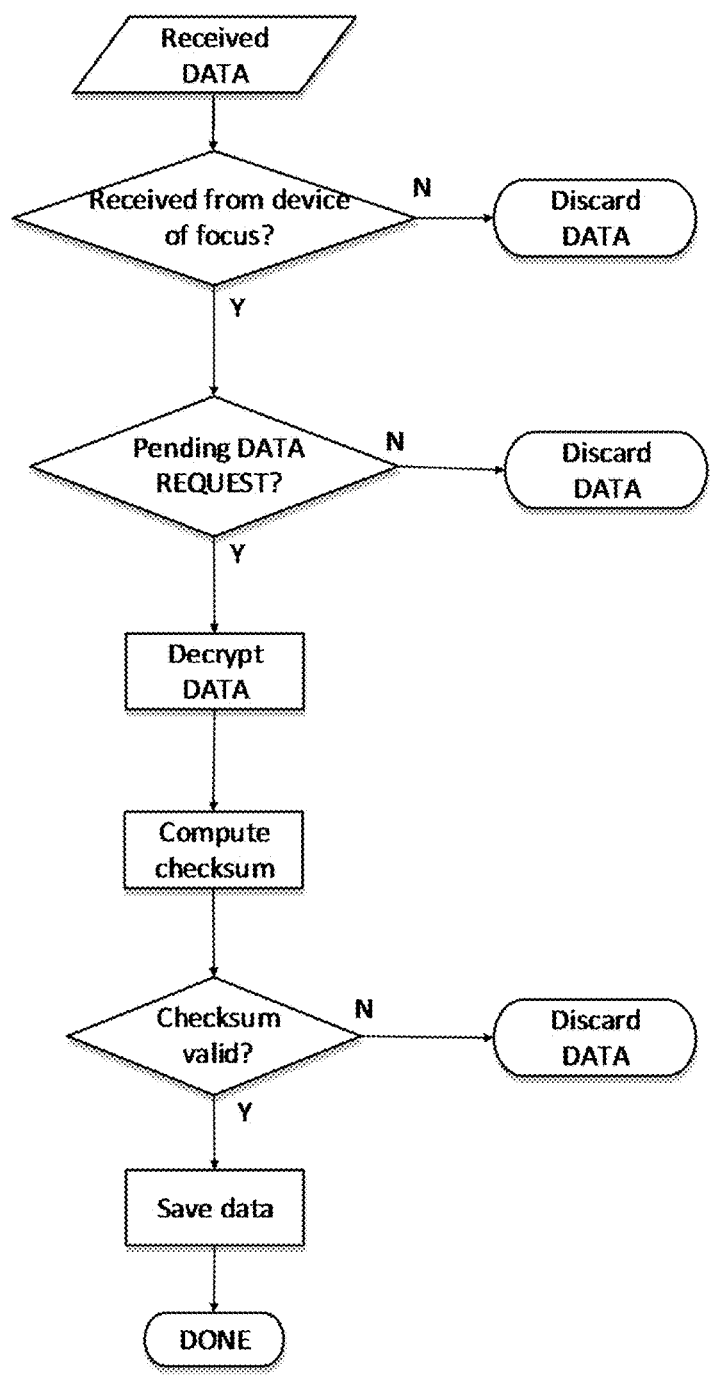
Figure 12 - Data Exchange - Receiving DATA

AUTOMATIC PEER SELECTION IN A FIELD OF COMMON PEERS

RELATED APPLICATION

This application claims the benefit of U.S. Provisional Patent Application No. 61/933,269, entitled, "System and Method of Automatic Pairing and Peer Selection with Visual Confirmation," filed on Jan. 29, 2014. The provisional application is hereby incorporated by reference for all purposes.

BACKGROUND

Field

The technology disclosed relates to secure exchange of data between mobile devices. In particular, pairwise cryptographic connections are automatically established between first and other mobile devices. Independently generated distinctive visual traits for display on a pair devices are based on a unique characteristic of a particular pairwise cryptographic connection. The independently generated distinctive visual traits allow a user to verify which two devices will exchange information, upon acceptance of a match between respective visual traits.

Introduction

The exchange of private data between mobile devices, such as contact info, has been an ongoing problem for mobile device users now for many years. There have been many attempts to solve this problem, trying to find the appropriate balance between ease of use, security, and general social acceptance. However, there still remains a need for a more robust method for quickly and easily connecting two physical devices, without the dependence on a server or any other intermediary service, so that data can be transferred only when intended and only to the intended recipient.

In the early years of mobile devices, such as Apple Newton and Palm Pilot, the use of infrared beaming proved to be popular and very functional. However, it was sometimes challenging for the users to align their devices such that the infrared sensors were perfectly facing each other.

In recent years infrared communication has lost favor, and the latest generation of mobile devices have relied instead on various wireless communication modes such as WIFI, Bluetooth, and NFC for the exchange of private data between mobile devices. Some commercially available solutions are Android Beam, Samsung S-Beam, Apple AirDrop and Bump.

Android Beam uses NFC, a point-to-point radio technology, to easily and securely transfer data between two devices that have to be held right next to each other in a very specific, back-to-back orientation. The caveats to this solution are that NFC is only available in a limited set of mobile devices (not available on iPhones), and it requires users to hold their devices in a very specific orientation with the devices essentially touching each other. This can be physical awkward to accomplish for novice users.

Samsung's S-Beam solution uses NFC to first establish a secure connection between two devices, and then switches over to using WIFI Direct for the actual data transfer between devices. The benefit over Android Beam is that data transfer is much faster over WIFI Direct than NFC. This solution requires newer mobile devices that support WIFI Direct, and still suffers from the same caveats noted for Android Beam.

Apple has recently provided a solution called AirDrop that is similar to Samsung's S-Beam. With AirDrop, two devices discover the presence of each other using either Bluetooth LE (a wireless PAN) or Bonjour over a local WIFI network. After the presence of other nearby mobile devices has been discovered, users are required to select the mobile device of the intended recipient from a list. Data transfer proceeds afterwards, using either the local WIFI network or with WIFI Direct if a local WIFI network is unavailable.

The benefit to AirDrop is that it does not require a user to hold their mobile device in a potentially awkward orientation. However, the caveat is that a mobile device user is now required to select the intended recipient from a list of other possible nearby recipients before they can proceed. And if the data transfer is bi-directional, as in the case of two mobile device users exchanging contact info, both mobile device users are required to identify and select the correct intended recipient from their respective lists.

Bump is a creative yet complex solution that requires Internet access, GPS, and an intermediary service, to easily and securely connect two mobile devices in preparation for data exchange. Two mobile users simply "bump" their two mobile devices against each other to initiate data transfer. With the event detected by onboard accelerometers, the current GPS geolocation and time are sent to a server from both mobile devices. The server, by matching received "bump" events by geolocation and time, is able to validate data exchange between two devices acting as a trusted intermediary. This solution is quick and easy for users to comprehend, but has numerous caveats. First of all, bumping of devices is a physically awkward task with each user not really sure how hard to bump, and how hard the other user is going to bump. Bump too hard, and one user may lose their grip of their mobile device. Bump too softly, and the "bump" event is not recognized. This solution is also very dependent on a complex set of services: a good GPS signal which is sometimes difficult to obtain indoors, access to the Internet, and access to the trusted intermediary online service.

There remains an opportunity to introduce a solution that is so simple that it does not break the flow of conversation between people. New technology could address issues such as solutions that require too many steps, require multiple attempts, or require a cognitive shift by requiring data input or device selection.

SUMMARY

The technology disclosed relates to secure exchange of private data between mobile devices. Pairwise cryptographic connections are automatically established between a first and other mobile devices. Independently generated distinctive visual traits are generated that allow a user to verify which two devices will exchange information, upon acceptance of a match between respective visual traits.

Some implementations of the technology disclosed provide a better way to securely exchange or transfer data between two mobile devices. Implementations of the technology disclosed may have some or all of have the following characteristics:

New implementations may not require the mobile device user to hold their mobile device in a physically awkward manner. The user should be able to simply hold their device in the natural way they are used to.

New implementations may not depend on other intermediary servers or online services. In other words, it would be a peer-to-peer solution. A simpler system implies robustness.

New implementations may not require additional steps beyond the single act of data exchange. Requiring additional steps, such as selecting a destination from a list of possible mobile device users, can be error-prone and cognitively disruptive.

Other aspects and advantages of the technology disclosed can be seen on review of the drawings, the detailed description and the claims, which follow.

BRIEF DESCRIPTION OF THE DRAWINGS

FIG. 1 illustrates implementation of the Slip service.

FIG. 2 illustrates one implementation of data structures maintained by the slip manager.

FIG. 3 illustrates a mobile device "C" scanning a wireless network neighborhood for other nearby mobile devices that provide the Slip service.

FIG. 4 illustrates secret key generation during pairing.

FIG. 5 illustrates pairwise secret key generation among six devices that have discovered each other.

FIG. 7 illustrates a mutually focused state.

FIG. 8 illustrates a physical arrangement of devices in which devices A and C are not mutually focused on one another.

FIG. 9 illustrates a communication exchange to ensure that the recipient is indeed the intended recipient.

FIG. 10 illustrates rejection of a bad actor.

FIGS. 11-12 illustrate a user approval protocol.

DETAILED DESCRIPTION

Figure 6A:
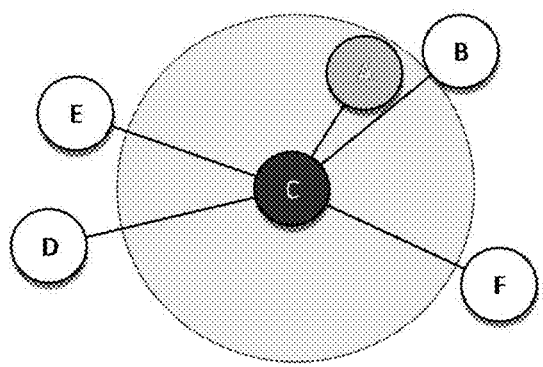
In FIGS. 6*a*, 6*b* and 6*c*, mobile device A is the nearest neighbor to mobile device C, and it is also within the predetermined range (indicated in grey) for mobile device C.

A detailed description of implementations of the technology disclosed is provided with reference to the FIGS. 1-12.

The technology disclosed, in some implementations, provides quick and easy data exchange between mobile devices using a wireless LAN or PAN (personal area network.) The technology disclosed provides a high degree of flexibility in how close mobile device users need to be to each other when they exchange data and in how users hold their respective mobile devices. One example implementation utilizes Bluetooth LE. Bluetooth LE is a wireless PAN that provides proximity information between device nodes using received radio signal strength indication (RSSI).

Proximity determination on wireless networks is often based on RSSI, but there are other available network characteristics that can be used for proximity determination. For instance, there may be an audio signal that different devices broadcast at different frequencies, which another device could use to infer proximity by the amplitude of a particular frequency. Or each device could simply share its GPS location with each other nearby device as part of the data each device advertises. Each device, knowing its own GPS location, could then determine the relative proximity of other nearby devices. GPS accuracy within mobile devices is limited to 3 to 5 meters, but with better radio receivers, GPS has the capability distinguish absolute terrestrial location to within a centimeter or less. It is not important what type of relative proximity determination between devices is available, as long as it is available. In Bluetooth LE the RSSI value, or some derived representation of RSSI, is sufficient. Nor is it important that the RSSI value be trusted. For example, a mobile device that is a bad actor that spoofs its own proximity by increasing its signal strength in unexpected ways will not compromise this method.

The challenge with using a wireless LAN for transmitting data on an ad hoc basis to another mobile device user is knowing what data is going to whom? Bluetooth LE, for instance, broadcasts over a physical area with a diameter of greater than 120 feet. Even if a user was able to select on their mobile device the intended recipient of any data transfer, what assurance does that user have that that other mobile device user is physically the actual intended recipient? What assurance does that mobile user have that some other mobile device user is not spying on all local radio transmission in that local area, and secretly capturing the contents of that data transmission?

This technology disclosed addresses these concerns with three main features:

Automatically establishing a pairwise cryptographically secure connection with nearby mobile devices simply through an act of discovery, and thus securely mediating a shared secret key that is pairwise unique to connections between mobile devices.

Establishing the intent to share or exchange data with another mobile device by automatically focusing on a particular device. Two proximal characteristics can be used by a first device to focus on a particular second device. The mobile devices (1) recognize each other as nearest neighbors, and (2) the mobile devices are within a certain maximum range of each other.

Displaying of a visual trait on the connected mobile devices, derived from the shared secret key unique to the pairwise connection between the mobile devices. Mobile device users confirm to their own satisfaction that the visual trait displayed on the connected mobile devices is the same. In most cases, this involves bilateral visual confirmation. If the visual traits match, matching is confirmed and data transfer can proceed securely. If the visual traits do not match, users will withhold their confirmation and data transfer will not proceed.

The visual trait can include multiple attributes of color, shape, pattern, and other designs, and can be either static imagery or dynamic animations. The current implementation uses both color and static patterns.

A mobile device using the technology disclosed is a true and equal peer to any other mobile device. There is no need for a central arbiter. Nor does one of the mobile devices need to assume a "master" role. This is a true peer-to-peer solution.

Technologies disclosed can remove the traditional requirement for the mobile device user to have to cognitively select from a list which other mobile device it would like to exchange data. Instead, the technology provides explicit visual assurance to the mobile device user of the mobile device that will receive the exchanged data, using visual confirmation and, optionally, bilateral visual confirmation.

Theory of Operation

System Architecture

Mobile devices use a connection method that we call the Slip service.

The Slip service can be packaged as a standalone app or can be packaged as a framework or module that can be included in other apps. Other apps can leverage the Slip service to provide their data transfer.

FIG. 1 illustrates implementation of the Slip service 120 by a Slip Advertiser 126, Slip Browser 124, Data Manager 122, and Slip Manager 125. The Slip Advertiser 126 advertises the availability of the Slip service 120 to other mobile devices. The Slip Advertiser 126 can be configured to generate a new private/public key pair periodically or when the Slip service is started on a mobile device.

The Slip Browser 124 scans for other mobile devices that are running their own copy of the Slip service 120, obtaining RSSI measurements and capturing the public keys advertised by other mobile devices.

The Data Manager 122 ensures that data is exchanged only with authorized mobile devices.

The Slip Manager 125 keeps track of mobile devices discovered by the Slip Browser. FIG. 2 illustrates one implementation of data structures maintained by the slip manager 125. Array elements 210, 220, 230 represent mobile devices running the Slip service that have been discovered by the Slip Browser 124. Data maintained for mobile devices that have been discovered includes the network identifier of that mobile device 212, its current proximity or RSSI 214, its public key 216, and a computed shared secret key 218.

Discovery

FIG. 3 illustrates a mobile device "C" scanning a wireless network neighborhood for other nearby mobile devices that provide the Slip service. During that discovery process, the mobile devices A, B, C, D, E and F, which are running the Slip service, obtain public keys from nearby other mobile devices.

In more detail, the Slip Browser 124 makes a request of the host OS 130 that manages WIFI 152, Bluetooth LE 156 or other radios, to scan for other mobile devices that are advertising the Slip service. Scanning can be performed using Bluetooth LE 156, or it can be performed using a combination of available radios managed by the host OS 130 (for example, both Bluetooth LE 156 and WIFI 152.)

As different mobile devices are discovered, information about that mobile device is passed from the host OS 130, to the Slip Browser 124, and onto the Slip Manage 125, where a data record 210 is created for the mobile device. If that device has already been discovered, then its existing data record is found and updated with the latest proximity measurement.

Pairing

Pairing in this application means that a mobile device has computed a secret key for securely exchanging encrypted information with another mobile device. Within a nearby scanning region, mobile devices become automatically paired with other mobile devices offering the Slip service soon after they are discovered and their public keys are obtained.

Pairing can be achieved using a public key exchange protocol. The current implementation employs the basic Diffie-Hellman key exchange protocol. There are other key exchange cryptographic schemes that could be used as well.

Wikipedia explains the Diffie-Hellman_key_exchange article that the protocol, "Allows two parties that have no prior knowledge of each other to jointly establish a shared secret key over an insecure communications channel. This key can then be used to encrypt subsequent communications using a symmetric key cipher".

Other key exchange cryptographic schemes could be used as well. The standard scheme uses a discrete logarithmic function, but another scheme could use a different cryptographic function such as an elliptical curve function. As Wikipedia explains in the Elliptic_curve_Diffie-Hellman article, "Elliptic curve Diffie-Hellman (ECDH) is an anonymous key agreement protocol that allows two parties, each having an elliptic curve public-private key pair, to establish a shared secret over an insecure channel. This shared secret may be directly used as a key, or better yet, to derive another key which can then be used to encrypt subsequent communications using a symmetric key cipher. It is a variant of the Diffie-Hellman protocol using elliptic curve cryptography."

One weakness of the Diffie-Hellman key exchange 441, 447 is vulnerability to a man-in-the-middle attack. However, given that this method is a wireless peer-to-peer method without any form of intermediate relay, it would be very difficult for a third party to interject themselves into the middle of the communication stream.

FIG. 4 illustrates secret key generation during pairing. A mobile device 414 combines its own self-generated private key 431, created by the Slip Advertiser, with the public key 432 obtained as part of the discovery process 424, 426 of another mobile device 416, to generate 441 a secret key 443 suitable for encrypting information for data transfer with the other mobile device. A reciprocal process is carried out by a second mobile device 416, including discovery 434, 436 and generation of a secret key 449. Private keys 431, 438 and the shared secret keys 443, 449 are not exposed outside of a device.

Mobile devices actively running the Slip service within the same local vicinity, generate a sets of secret keys unique to pairwise connection with the mobile devices that they discover. These shared (symmetric) secret keys allow secure transfer data between pairs of mobile devices. These sets of keys provide pairwise cryptographically secure connections.

FIG. 5 illustrates pairwise secret key generation among six devices that have discovered each other. The devices in this scenario have five shared secret keys, generated from five public keys received from the other devices. The shared secret keys are pairwise unique and available on the pair of machines involved without any need to transmit the secret from one machine to the other.

Automatic Peer Selection

A mobile device selects another mobile device with which to exchange information. The device does this automatically by (A) determining which other nearby mobile device is its nearest neighbor, and (B) whether that nearest neighbor is within a predetermined range.

Technically, the predetermined proximity range is not a necessary requirement; this method would function without it. The purpose of enforcing a range, such as 20 cm, 1 m, 2 m, 3 m or in any range bounded by two of these distances is to ensure that a pair of mobile device users are close enough to physically identify their intended recipients by viewing visual traits that appear on each other's devices.

Figure 6B:
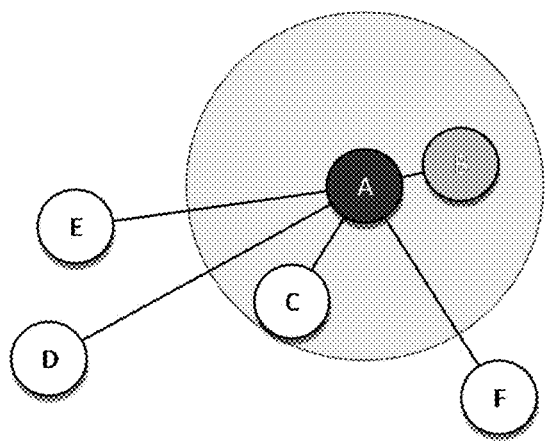
Figure 6C:
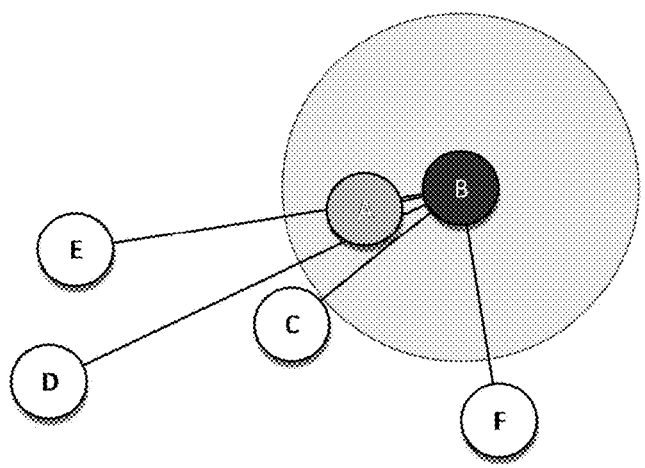

FIGS. 6*a*-*c* illustrate focus relationships among mobile devices A, B and C. In this series of figures, the physical relationships among A-C are preserved. Other mobile devices D-F are slightly arranged in the figures, but not in an operative way, as the explanation focuses on A-C and none of D-F are within the predetermined distances illustrated by gray circles. In each figure, a mobile device has focused its active exchange attention exclusively on one other mobile device. Since each mobile device determines its own exclusive focus of attention, focus is not necessarily mutual.

In FIG. 6*a*, mobile device A is the nearest neighbor to mobile device C, and it is also within the predetermined range (indicated in grey) for mobile device C. A mobile device that satisfies the criteria of (1) nearest neighbor and (2) within range, is said to be the "focus" of the other mobile device. In FIG. 6*a*, mobile device A is the focus of device C. However, the inverse may or may not necessarily be true.

In FIG. 6*b*, mobile device A is focused on mobile device B. In this state of focus, some implementations do not allow transfer of information between mobile device A and mobile device C, because that is not where mobile device A has focused its attention.

In FIG. 6c, mobile device B has focused its attention on mobile device A, as the closest eligible device. Taken together, FIGS. 6b-c illustrate mutual focus between devices A and B.

In the case where two mobile devices have deemed each other as the device of focus, such as mobile devices A and B, both devices are considered mutually focused.

In other implementations, not illustrated, two devices can negotiate bilaterally to establish an agreed mutual focus. For instance, whenever one device calculates that another is the closest eligible device, it can initiate a message exchange to invite the other device to establish a mutual focus. Overall, focus can be established either unilaterally or mutually, depending on the approach selected.

When a mutual focus is established and an acceptance signal is transmitted from one received by another, the two mobile devices can, optionally, freeze their exclusive focus on one another for a predetermined time or until they become separated by a first predetermined distance or by a longer second predetermined distance. This can be useful in a crowded room where passersby could unintentionally interrupt an attempted information exchange.

Bilateral Visual Confirmation

FIG. 7 illustrates bilateral visual confirmation, which assures a mobile device user of the physical identity of an intended recipient. When a mobile device's attention is focused on another device, it displays a visual trait of the pairwise cryptographic connection with the focus of its attention. When a mobile device does not have a focused device 710, it does not display a visual trait and instead displays its quiescent state.

The visual trait can include multiple attributes of color, shape, pattern, and other designs, and can be either static imagery or dynamic animations. The visual trait is derived from the independently generated secret key that the mobile device shares with its focused device, and is mapped to an extremely large set of possible visual traits so that it is unlikely that two different mobile devices that do not share the same secret key would display the same visual trait.

One way to create a visual trait is to simply generate a one way hash of the shared secret key using the MD5 hash algorithm, and then map the first 24 bits to a 24-bit color. This yields over 16 million possible colors making it statistically unlikely that two mobile devices that do not share the same secret key would display the same visual trait. Different research results have shown that the human eye can distinguish from between 100,000 and 10 million colors. If overlay patterns or multi-color designs are also used, visual mappings can be easily created such that the odds of two mobile devices, that do not share the same secret key displaying the same visual trait, would be far greater than 10 million to 1.

When two mobile devices display the same visual trait 720, both users of those devices are able to visually confirm that both mobile devices are mutually focused. It confirms for both users that the other's mobile device is in fact the intended recipient of any information exchange.

There may be times when there are more than two nearby mobile devices all running the Slip service. Imagine a scenario where Device A and Device C both satisfy the peer selection criteria of nearest neighbor and minimum threshold range. They would both display visual traits 730 indicative of the device they have their attention focused on.

FIG. 8 illustrates one physical arrangement of devices in which mobile device A would not be displaying the same visual trait as device C, because mobile device A's nearest neighbor is device B and would thus be focused on device B. Mobile device B would also be displaying a visual trait because device A satisfies the peer selection criteria of nearest neighbor and minimum threshold range for device B, making device A the focus of device B. Since both mobile device A and B are mutually focused, they would display the same visual trait.

Data Exchange

The type of information exchanged is not bound to any particular data. The initial intention is for the exchange of contact info and vcards, but the same method is applicable for images, photos, videos, web pages, songs, audio clips, social connections, documents, any kind of text, and could even be used for financial transactions including credit cards and virtual currencies.

Once two users are able to bilaterally, visually confirm a connection between two mobile devices, they can proceed with secure data exchange.

Data exchange becomes possible, in one implementation, when both devices exhibit the same visual trait. Exhibiting the same visual trait implies that both mobile devices have established a pairwise cryptographic connection, have satisfied both peer selection criteria of nearest neighbor and being within a predetermined range, and are mutually focused.

If the data to be transmitted has already been pre-selected, it takes only a single action of at least one user to initiate the data exchange. In some implementations, both users need to signal their approval for the data exchange. This action can be any kind of multi-touch screen gesture, a particular motion of the mobile device, or any other user interaction or motion that can act as a trigger.

In some implementations, the action that approves the data exchange is so simple that it does not change the user's cognitive focus. Matching distinctive visual traits does not involve a cognitive process of choosing a destination mobile device or other endpoint from a list of endpoints. Approving a match is a simpler trigger for the user than a choose-and-pair protocol.

Data exchange between devices can be symmetric. In other words, the same logic and steps are followed when sending data from Device A to Device B, as when sending data from Device B to Device A. Exchanges can proceed concurrently.

FIG. 9 illustrates one message exchange that can precede a data exchange. The illustrated communication ensures that the device recognized destination is indeed the user's intended recipient, and ensures the human recipient that data is being received from the intended originator. Many other message exchange sequences can implement a handshake between the mobile devices.

In FIG. 9, mobile device A 903 prepares 913 and sends a SEND REQUEST 915 to its focused device when it receives the user trigger.

Device B 907 accepts the SEND REQUEST only if it originated from its device of focus 917. If so, it replies with a DATA REQUEST 925.

Device A 903 accepts the DATA REQUEST 925 only if it originated from its device of focus 923, AND if it has a pending SEND REQUEST 915 to the same device. If these conditions are met, Device A 903 encrypts the data with the appropriate secret key, which in this case is SAB. The encrypted data is then sent 935 to its focused device.

Device B 907 now accepts the encrypted data only if it originated from its device of focus 937, AND if it has a pending DATA REQUEST 925 to the same device. If these two conditions are met, Device B decrypts the data with the secret key associated with its focused device, SAB in this example.

Typically, the data incorporates a data checksum, hash or signature. If the integrity check of the decrypted data does not match the included checksum or hash, the data can be discarded.

If two mobile devices are not mutually focused, they will not share the same visual trait, not use the same secret key, and they will not transfer data between themselves.

Now consider a situation where the user of Device B is not the intended recipient of data from the user of Device A. And assume that the user of Device B is a bad actor and has modified (hacked) the Slip service. No matter what level of re-engineering they perform, they can only gain the trust of the user of Device A by displaying the same visual trait as Device A.

Statistically, the probability is close to zero that Device B could generate the same visual trait as Device A without the two devices actually being pairwise cryptographically connected. This is why bilateral visual confirmation is so useful. It provides visual feedback to the user of Device A as to who the actual recipient is. So if Device B, acting in bad faith tries to receive data from Device A, it would never get that data because the user of Device A would not even initiate a data exchange with someone they do not want to share data with.

Bilateral Data Exchange

There are two additional scenarios to consider in dealing with bad actors that try to subvert the trusted exchange of data between two devices that have established a pairwise cryptographic connection:

A bad actor receiving another user's data from their device when the user has not granted permission to send that data.

A bad actor sending data to a user's device when that user does not want to receive that data.

Scenario 1

The only way in which a bad actor could try to receive data from another user's device without their permission, would be to make a DATA REQUEST without having already received a SEND REQUEST (FIG. 9). However, no data will be sent from the device unless that device has sent a SEND REQUEST to its focused device. This scenario would not succeed because no SEND REQUEST would be sent without the user of that device initiating the data exchange. And without bilateral visual confirmation, the user would not initiate a data exchange.

Scenario 2

FIG. 10 illustrates a bad actor trying to send data to a user's device, such as undesired advertising, either without the receiving device user's permission or without the receiver's prior knowledge. To attempt this a bad actor (device BAD in FIG. 10) would increase their radio transmission power, so as to give the illusion to the receiving device that the bad actor is the closest device and within the predetermined range of the receiving device A.

If there are no other closer devices also within the predetermined range, device BAD would be considered device A's focused device, and Device BAD, being a bad actor would simply assume the same, resulting in both devices being mutually focused.

Without any additional safeguards, a bad actor (Device BAD) would be able to send undesired data to a mobile device (Device A).

Two safeguards that can be implemented. The first safeguard is to only allow bilateral data exchanges. For example, two users may mutually exchange contact information. Applying this safeguard, the devices delay acting on any SEND REQUEST they receive at least until they have sent their own SEND REQUEST.

In FIG. 10, if data exchange was restricted to bilateral data exchange only, the user of device A would never initiate a data exchange with device BAD because the user of device BAD would not be in the immediate physical vicinity to allow the user of device A to perform a bilateral visual confirmation. Without a bilateral visual confirmation, device A would never exchange data with device BAD.

Another safeguard that can be implemented is to add a parameter in the SEND REQUEST which identifies the request as either a BILATERAL data exchange, or a UNILATERAL data exchange. If the parameter is set to BILATERAL, the prior safeguard would be invoked.

If the parameter is set to UNILATERAL, the user of the device receiving the data would be asked to approve the SEND REQUEST, as presented in FIGS. 11-12. Thus, a mobile device user can prevent receiving unwanted data without their permission or knowledge, especially if the sender is not in the immediate physical vicinity, and cannot be physically identified with bilateral visual confirmation.

Additional Use: Glass Bowl Feature

An interesting derivative of this application is the automatic gathering of business cards, or contact info, by vendors at trade shows. Rather than depositing business cards in a glass bowl for a prize, a vendor could setup a stationary device like a tablet affixed to a table, running the Slip service.

As various trade show attendees visit the vendor's booth, they can "deposit their business card" simply by holding their Slip-enabled mobile device next to the vendor's tablet, sending their contact information as soon as both devices display a bilateral visual confirmation.

In this manner, a stationary computer, tablet, or mobile device, could be used to voluntarily collect all kinds of information that a passing mobile device user chooses to send, and may even be incentivized to do (like for prizes or raffles).

Additional Use: Group Data Exchange

Group data exchange is the exchanging of data, simultaneously, within a proximal group of devices. As an example, a group of people who are all meeting together and who would like to exchange contact info with each other.

In this scenario, the mobile device user would forego bilateral visual confirmation, as well as the requirement for devices to be mutually focused in order for data exchange to proceed.

Members of the group would put the Slip service on their device into permissive mode. In permissive mode, mobile device users would be able to receive data automatically, without confirmation or approval, and without the requirement for enforced bilateral data exchange. They also would be able to broadcast to all other nearby devices running the Slip service as part of the discovery data, an alias or identifier that distinguishes them from all other nearby users (like their initials or first name with last name initial)

In permissive mode, users would see a list of all of the other nearby devices that are also in permissive mode, sorted by proximity, displaying the alias associated with each device.

The user then simply selects one or more of the devices listed on their screen, or selects all and deselects some. With a single action such as tapping a button or using a gesture, the user sends their contact or other information to the selected devices.

The data exchange between devices would be secured using the same shared secret keys as in FIG. 5.

Particular Implementations

In one implementation, a method is described that includes an app running on a first mobile device initiating a plurality of pairwise cryptographically secure connections with applications running on a second mobile device and on one or more third mobile devices. The method includes using at least one unique characteristic of the pairwise cryptographically secure connection with the second mobile device to generate a visual trait for display on the first mobile device that is capable of being independently generated by the second mobile device. It further includes receiving a signal indicating that at least one user of the first or second mobile devices has accepted a match of the visual trait generated on the first mobile device to a visual trait observed from the second mobile device. It can include, responsive to the acceptance signal, sending information to or accepting information from the second mobile device using the pairwise cryptographically secure connection.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features.

The method can further include rejecting the acceptance signal if the second mobile device is not calculated to be within a predetermined distance.

The method can further include the app focusing active exchange attention exclusively on the second mobile device only when it is measured to be closer to the first mobile device than the third mobile devices and responding to the acceptance signal only when the app has focused the active exchange attention on the second device.

The method can further include the first mobile device refocusing its active focus of attention from the second device to one of the third mobile devices that is calculated to have approached closer to the first mobile device than the second mobile device; and not responding to the acceptance signal related to pairwise connection with the second mobile device while the active focus of attention is focused on the third mobile device.

The method can further include the first mobile device maintaining the active focus of attention on the second device for a predetermined time after receiving the acceptance signal, even if one of the third mobile devices is calculated to approach closer to the first mobile device than the second mobile device.

The method can further include receiving at least a pair of signals indicating that users of both the first and second mobile devices accepted the match. This can be extended by rejecting the pair of acceptance signals if the second mobile device is not calculated to be within a predetermined distance. Or, by the app focusing active exchange attention exclusively on the second mobile device only when it is measured to be closer to the first mobile device than the third mobile devices and responding to the acceptance signal only when the app has focused the active exchange attention on the second device.

Other implementations may include a computer readable storage device storing instructions executable by a processor to perform a method is described above. In this application, computer readable storage device is defined as excluding transitory wave and electronic signals. Computer readable storage device uses volatile and non-volatile storage devices. Examples of such devices are DRAM, SRAM, DVD, rotating memory, thumb drives and other solid state memory devices drives.

Yet another implementation may include a system with memory and one or more processors operable to execute instructions stored in memory to perform a method is described above.

In another implementation, a method is described that includes an app running on a first mobile device establishing a pairwise cryptographically secure connection with an application running on a second mobile device that is calculated to be closer to the first mobile device than other eligible mobile devices. This method includes using a unique characteristic of the pairwise cryptographic connection to generate a distinctive visual trait for display on the first mobile device that can be independently generated for display on the second mobile device. It further includes receiving a signal indicating that a least one user of either the first or second mobile device has matched the distinctive visual trait generated for display on the first mobile device to the distinctive visual trait independently generated for display on the second mobile device. This method can include, responsive to the signal, transmitting information to or receiving information from the second mobile device.

This method and other implementations of the technology disclosed can include one or more of the following features and/or features described in connection with additional methods disclosed.

This method can be extended to include the first and second mobile devices both displaying independently generated copies of the distinctive visual trait.

This method can include the app calculating which one of the eligible mobile devices is closest to the first mobile device, focusing active exchange attention exclusively on the closest eligible mobile device, and responding to an acceptance signal from one of the eligible mobile devices only if it arrives via the cryptographically secure connection with closest eligible mobile device that is the focus of the exclusive active exchange attention.

This method can be extended to include the acceptance signal originating from at least one user who visually confirmed that the first and second mobile devices were displaying matching distinctive visual traits.

This method can be extended to include receiving at least a pair of signals indicating that users of both the first and second mobile devices have confirmed that the first and second mobile devices were displaying matching distinctive visual traits.

This method can be extended to include using the pairwise cryptographic connection between the first and second mobile devices for the transmitting information to or receiving information from the second mobile device.

One device implementation of the technology disclosed includes a processor and memory coupled to the processor. The memory contains instructions that, when executed by the processor, cause the mobile device to initiate a plurality of pairwise cryptographically secure connections with applications running on a second mobile device and on one or more third mobile devices. The instructions further cause the mobile device to use unique characteristics of the pairwise cryptographically secure connection with the second mobile device to generate a visual trait for display on the first mobile device that is capable of being independently generated by the second mobile device. And, receive a signal indicating that at least one user of the first or second mobile devices has accepted a match of the visual trait generated on the first mobile device to a visual trait observed from the second mobile device. Responsive to the acceptance signal, the device further can send information to or accept information from the second mobile device using the pairwise cryptographically secure connection.

All aspects and features of methods described herein can be practiced by a mobile device that practices the technology disclosed. For the sake of conciseness, those aspects and features are not generally repeated either here or in the computer readable media implementation presented below.

The instructions further cause the mobile device to the instructions causing the mobile device to focus active exchange attention exclusively on the second mobile device only when it is measured to be closer to the first mobile device than the third mobile devices and to exchange information with the second device, responsive to the acceptance signal, only when the active exchange attention is focused on the second device.

A computer readable storage device implementation excludes transitory wave and electronic signals. As indicated above, a computer readable storage device uses volatile and non-volatile storage devices. Examples of such devices are DRAM, SRAM, DVD, rotating memory, thumb drives and other solid state memory devices drives.

The computer readable storage device includes memory containing instructions that, when executed on hardware of a mobile device, cause the mobile device to initiate a plurality of pairwise cryptographically secure connections with applications running on a second mobile device and on one or more third mobile devices; to use unique characteristics of the pairwise cryptographically secure connection with the second mobile device to generate a visual trait for display on the first mobile device that is capable of being independently generated by the second mobile device; and to receive a signal indicating that at least one user of the first or second mobile devices has accepted a match of the visual trait generated on the first mobile device to a visual trait observed from the second mobile device.

The instructions can further, responsive to the acceptance signal, cause the mobile device to send information to or accept information from the second mobile device using the pairwise cryptographically secure connection.

The instructions can further cause the mobile device to actively focus attention exclusively on the second mobile device only when it is measured to be closer to the first mobile device than the third mobile devices and to exchange information with the second device, responsive to the acceptance signal, only when the active exchange attention is focused on the second device.

I claim as follows:

1. A method for verifying a particular peer mobile device as an intended receiver of data transmitted from another peer mobile device among a plurality of peer mobile devices, comprising:
a first application running on a first mobile device focusing attention exclusively on a second mobile device only when the first mobile device measures the second mobile device to be closer to the first mobile device than any third mobile devices and the second mobile device is within a predetermined range for the first mobile device;
a second application running on the second mobile device focusing attention exclusively on the first mobile device only when the second mobile device measures the first mobile device to be closer to the second mobile device than any of the third mobile devices and the first mobile device is within a predetermined range for the second mobile device;
establishing a mutual focus connection between the first mobile device and the second mobile device when the first application running on the first mobile device focusing attention exclusively on the second mobile device and, at the same time, the second application running on the second mobile device focusing attention exclusively on the first mobile device, wherein the mutual focus connection is indicated by the first mobile device and the second mobile device both displaying a matching visual trait independently derived based on a pairwise secret key unique to the established mutual focus connection;
exchanging user data between the first mobile device and the second mobile device using the established mutual focus connection, and in response to a visual confirmation wherein at least a user of the first mobile device or the second mobile device accepting a match of the visual trait displayed on the first mobile device to the visual trait displayed on the second mobile device; and
wherein the mutual focus connection is maintained for a predetermined time after the visual confirmation even if one of the third mobile devices is calculated to approach closer to the first mobile device than the second mobile device or approach closer to the second mobile device than the first mobile device.

2. The method of claim 1, further including displaying matching independently derived visual traits on the first mobile device and the second mobile device that are unique to a specific pairing of the first mobile device and the second mobile device, prior to the user of the first mobile device or the second mobile device accepting the match of the visual trait.

3. The method of claim 1, further including receiving the user data by a receiving device only if the receiving device is exclusively focusing attention on a transmitting device that is transmitting the user data.

4. The method of claim 1, further including the first mobile device refocusing attention exclusively on one of the third mobile devices when the one of the third mobile devices is measured to be closest to the first mobile device, without user intervention, thereby ending the mutual focus connection between the first mobile device and the second mobile device.

5. The method of claim 1, further including both users of the first mobile device and the second mobile device accepting a match of the visual trait displayed on the first mobile device to the visual trait displayed on the second mobile.

6. The method of claim 5, further including transmitting the user data bi-directionally between the first mobile device and the second mobile devices.

7. The method of claim 1, further including automatically transmitting the user data to a receiving device that accepted the match of the visual trait.

8. A non-transitory computer readable media impressed with instructions configured to carry out a method for verifying a particular peer mobile device as an intended receiver of data transmitted from another peer mobile device among a plurality of peer mobile devices, the method comprising:

a first application running on a first mobile device focusing attention exclusively on a second mobile device only when the first mobile device measures the second mobile device to be closer to the first mobile device than any third mobile devices and the second mobile device is within a predetermined range for the first mobile device;

a second application running on the second mobile device focusing attention exclusively on the first mobile device only when the second mobile device measures the first mobile device to be closer to the second mobile device than any of the third mobile devices and the first mobile device is within a predetermined range for the second mobile device;

establishing a mutual focus connection between the first mobile device and the second mobile device when the first application running on the first mobile device focusing attention exclusively on the second mobile device and, at the same time, the second application running on the second mobile device focusing attention exclusively on the first mobile device, wherein the mutual focus connection is indicated by the first mobile device and the second mobile device both displaying a matching visual trait independently derived based on a pairwise secret key unique to the established mutual focus connection;

exchanging user data between the first mobile device and the second mobile device using the established mutual focus connection, and in response to a visual confirmation wherein at least a user of the first mobile device or the second mobile device accepting a match of the visual trait displayed on the first mobile device to the visual trait displayed on the second mobile device; and wherein the mutual focus connection is maintained for a predetermined time after the visual confirmation even if one of the third mobile devices is calculated to approach closer to the first mobile device than the second mobile device or approach closer to the second mobile device than the first mobile device.

9. The non-transitory computer readable media of claim 8, further configured to carry out the method including displaying matching independently derived visual traits on the first mobile device and the second mobile device that are unique to a specific pairing of the first mobile device and the second mobile device, prior to the user of the first mobile device or the second mobile device accepting the match of the visual trait.

10. The non-transitory computer readable media of claim 8, further configured to carry out the method including receiving the user data by a receiving device only if the receiving device is exclusively focusing attention on a device that is transmitting the user data.

11. The non-transitory computer readable media of claim 8, further configured to carry out the method including the first mobile device refocusing attention exclusively on one of the third mobile devices when the one of the third mobile devices is measured to be closest to the first mobile device, without user intervention, thereby ending the mutual focus connection between the first mobile device and the second mobile device.

12. The non-transitory computer readable media of claim 8, further configured to carry out the method including both users of the first mobile device and the second mobile device accepting a match of the visual trait displayed on the first mobile device to the visual trait displayed on the second mobile.

13. The non-transitory computer readable media of claim 12, further configured to carry out the method including transmitting the user data bi-directionally between the first mobile device and the second mobile devices.

14. The non-transitory computer readable media of claim 8, further configured to carry out the method including automatically transmitting the user data to a receiving device that accepted the match of the visual trait.

15. A system including a first mobile device, a second mobile device and third mobile devices, each of the first mobile device, the second mobile device, and the third mobile devices including a processor and memory impressed with instructions configured to carry out a method for verifying a particular peer mobile device as an intended receiver of data transmitted from another peer mobile device among a plurality of peer mobile devices, comprising:

a first application running on a first mobile device focusing attention exclusively on a second mobile device only when the first mobile device measures the second mobile device to be closer to the first mobile device than any of the third mobile devices and the second mobile device is within a predetermined range for the first mobile device;

a second application running on the second mobile device focusing attention exclusively on the first mobile device only when the second mobile device measures the first mobile device to be closer to the second mobile device than any of the third mobile devices and the first mobile device is within a predetermined range for the second mobile device;

establishing a mutual focus connection between the first mobile device and the second mobile device when the first application running on the first mobile device focusing attention exclusively on the second mobile device and, at the same time, the second application running on the second mobile device focusing attention exclusively on the first mobile device, wherein the mutual focus connection is indicated by the first mobile device and the second mobile device both displaying a matching visual trait independently derived based on a pairwise secret key unique to the established mutual focus connection;

exchanging user data between the first mobile device and the second mobile device using the established mutual focus connection, and in response to a visual confirmation wherein at least a user of the first mobile device or the second mobile device accepting a match of the visual trait displayed on the first mobile device to the visual trait displayed on the second mobile device; and wherein the mutual focus connection is maintained for a predetermined time after the visual confirmation even if one of the third mobile devices is calculated to approach closer to the first mobile device than the second mobile device or approach closer to the second mobile device than the first mobile device.

16. The system of claim 15, further configured to carry out the method including displaying matching independently derived visual traits on the first mobile device and the second mobile device that are unique to a specific pairing of the first mobile device and the second mobile device, prior to the user of the first mobile device or the second mobile device accepting the match of the visual trait.

17. The system of claim 15, further configured to carry out the method including receiving the user data by a receiving device only if the receiving device is exclusively focusing attention on a device that is transmitting the user data.

18. The system of claim 15, further configured to carry out the method including the first mobile device refocusing attention exclusively on one of the third mobile devices when the one of the third mobile devices is measured to be closest to the first mobile device, without user intervention, thereby ending the mutual focus connection between the first mobile device and the second mobile device.

19. The system of claim 15, further configured to carry out the method including both users of the first mobile device and the second mobile device accepting a match of the visual trait displayed on the first mobile device to the visual trait displayed on the second mobile.

20. The system of claim 19, further configured to carry out the method including transmitting the user data bi-directionally between the first mobile device and the second mobile device.

21. The system of claim 15, further configured to carry out the method including automatically transmitting the user data to a receiving device that accepted the match of the visual trait.

* * * * *